United States Patent

[11] 3,621,315

[72] Inventors Bror Dalmo
Vasteras;
John Franked, Vasteras; Hans Landhult, Vasteras; Birger Nordberg, Vasteras; Carl Ronnevig, Vasteras; Ove Tjernstrom, Irsta, all of Sweden
[21] Appl. No. 882,262
[22] Filed Dec. 4, 1969
[45] Patented Nov. 16, 1971
[73] Assignee Allmanna Svenska Elektriska Aktiebolaget Vasteras, Sweden
[32] Priority Dec. 23, 1968
[33] Sweden
[31] 17,729/68

[54] DAMPING WINDING FOR ROTATING POLE SYSTEM
1 Claim, 7 Drawing Figs.
[52] U.S. Cl. .................................................. 310/183, 310/64, 310/197, 310/214
[51] Int. Cl. ............................................... H02k 19/26
[50] Field of Search ........................................... 310/183, 182, 64, 187, 192, 156, 197, 213, 214, 215, 218, 162

[56] References Cited
UNITED STATES PATENTS
| | | | |
|---|---|---|---|
| 1,637,182 | 7/1927 | Glaubitz ........................ | 310/183 |
| 2,727,161 | 12/1955 | Kilner ........................... | 310/64 |
| 2,719,931 | 10/1955 | Kober ........................... | 310/156 |
| 2,831,133 | 4/1958 | Hansen ......................... | 310/183 |
| 3,189,769 | 6/1965 | Willyoung ..................... | 310/64 |

OTHER REFERENCES

German Patent Publication No. 1,050,887; Licentia; 2/1959; 310/183; 1 sh. of Dwgs.; 2 pp. spec.

Primary Examiner—D. X. Sliney
Assistant Examiner—R. Skudy
Attorney—Jennings Bailey, Jr.

ABSTRACT: In a pole system which has damping winding slots, a damping winding is positioned in the slots. This winding is formed of damping rods of electrically conducting material and cooling tubes arranged in the slots. The damping rods are connected outside the slots by short-circuiting rings. Each damping window slot contains at least one cooling tube and two adjacent part conductors. Each part conductor has a groove therein, and a cooling tube or tubes are arranged in the grooves. The part conductors are held in position and wedges inserted into the slots are locked in position.

PATENTED NOV 16 1971 3,621,315
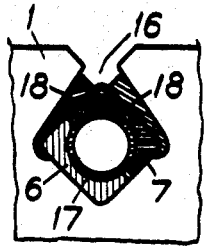 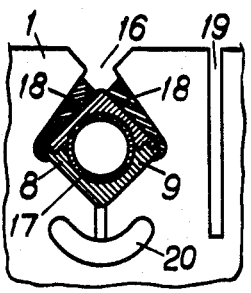 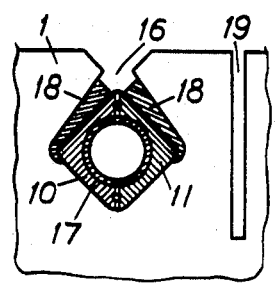
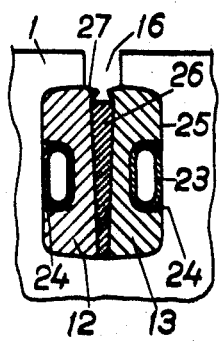 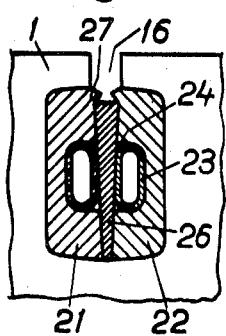 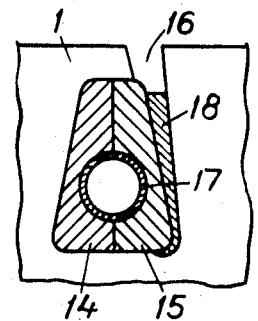
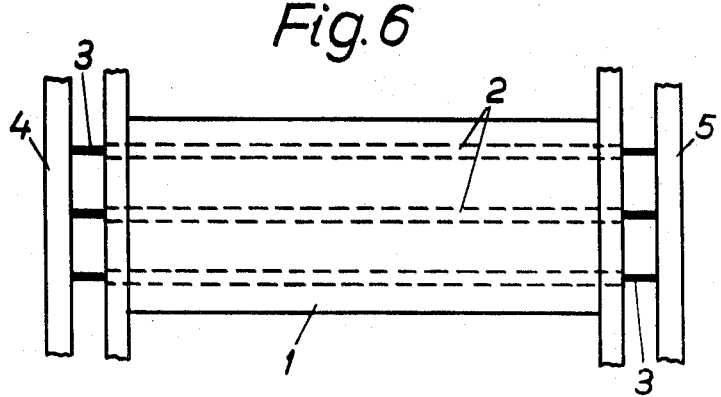
INVENTOR.
BROR DALMO   BIRGER NORDBERG
JOHN FRANKED   CARL RÖNNEVIG
HANS LANDHULT   BY OVE TJERNSTRÖM

DAMPING WINDING FOR ROTATING POLE SYSTEM

BACKGROUND OF THE INVENTION

1. Field of the Invention

The present invention relates to a damping winding for a pole system having a plurality of poles, said winding comprising damping rods of electrically conducting material provided with cooling tubes arranged in damping winding slots running axially in the airgap surfaces of the poles and connected to each other by means of short-circuiting rings.

2. The Prior Art

Such a winding is often used as starting winding in synchronous motors and synchronous compensators and in the following expression "damping widing" is presumed to cover the above-mentioned fields of use also.

In a directly cooled damping winding extremely high current densities may occur and when cooling tubes are used it is therefore of great importance that the heat transmission between cooling tubes and conductor is effective. If there is insufficient thermal contact along any part of the cooling tubes, destructive heating may arise even if the length of the part is very short. Since a damping winding is usually subjected to great temperature differences—for example the difference between the temperature at starting and during normal operation —a permanent clearance may easily arise between conductor and cooling tube and/or between conductor and slot walls. Even a clearance of the latter type may cause damaging temperature increases since it is essential that a part of the heat generated is conducted into the pole shoe so that its heat capacity is exploited to a certain extent.

SUMMARY OF THE INVENTION

In a construction according to the invention an extremely high contact pressure is achieved in the heat-transmitting surfaces along with a stable positioning of the damping winding rods.

A damping winding according to the invention is characterized in that each damping winding operation—contains at least one axially directed cooling tube and at least two adjacent part-conductors and a number of wedges inserted substantially perpendicular to the axial direction, said part-conductors having longitudinal grooves shaped with contact surfaces for a cooling tube, the groove of each part-conductor together with a similar groove in another part-conductor or together with the wall of the groove or said wedges forming a channel in which a cooling tube is clamped by the wedge force.

BRIEF DESCRIPTION OF THE DRAWINGS

In the following the invention will be described with reference to the accompanying schematical drawings, in which FIGS. 1, 2, 3, 4, 4a and 5 show different embodiments in partial radial section through a pole shoe provided with the damping winding.

FIG. 6 shows a radial view of a magnetic pole provided with a damping winding according to the invention.

DESCRIPTION OF THE PREFERRED EMBODIMENTS

In the drawings 1 designates a laminated pole shoe containing axially directed damping rods 2 which surround cooling tube 3 connected to a collecting ring 4 for liquid supplied and a collecting ring 5 for liquid removed. The damping rods in the pole shoe 1 and also damping rods arranged in the same way in the other poles of the machine, are connected at their ends to the short-circuiting rings 4 and 5.

In FIGS. 1–5 the damping rods consist of part-conductor pairs, the two part-conductors being designated 6 and 7, 8 and 9, 10 and 11, 12 and 13, 21 and 22, and 14 and 15, respectively. The part-conductors are of copper and each has a longitudinal slot which in the present description is known as a "-groove" to avoid confusion with the damping winding slot 16.

In FIGS. 1–3 and in FIG. 5 the groove is semicircular and the part-conductors 6,7: 8,9: 10,11: 14,15: respectively, arranged so that together the grooves for a channel in which a cooling tube 17 of stainless steel having circular cross section is arranged. A number of wedges 18 of metal having great heat-conducting capacity are inserted in the damping winding slot 16 substantially perpendicular to the direction of the slot, the cooling tube 16 thus being subjected to such high radial pressure that plastic, or at least a very great elastic deformation of the cooling tube is achieved at a normal temperature. In spite of the fact that copper has a greater coefficient of thermal expansion than steel, the heat transmission is effectively retained between cooling tube and part-conductor at high temperatures since the cooling tube has the ability to expand elastomerically and, and furthermore, the walls of the hollow damping conductor rod formed by the part-conductors are subjected to forces directed radially inwards which give elastomeric deformation. An additional increase in the elasticity of the clamping mechanism can be achieved by providing the pole shoe 1 with axially directed slits 19 and/or holes 20 as shown in FIGS. 2 and 3.

The wedges 18 may be given the same axial dimension as the damping winding slot, or several wedges may be arranged axially one after the other. The wedges are locked in position since the space intended for the point of the wedge is edged by curved surfaces.

In FIG. 4 the cooling tubes 23 having oval cross section and are arranged in individual tubular channels 24 running axially which are formed by the groove in a part-conductor 12, 13 and an adjacent slot wall 25. A wedge 26 is inserted in radial direction between the part-conductors 12 and 13. The wedge is locked since the upper edges of the part-conductors are upset to form tangential projections 27 to partly cover the end surface of the wedge. The embodiment shown in FIG. 4a differs from the construction according to FIG. 4 in that the part-conductors 21 and 22 are shaped have grooves facing the center of the damping winding slot and, together with the wedge 26, form channels for the cooling tubes 23.

We claim:

1. Damping winding for a synchronous machine having a plurality of poles, laminated pole shoes for said poles and damping winding slots in said poles, said winding comprising liquid-cooled damping rods of high-conductivity electrically conducting material provided with cooling tubes of stainless steel arranged in said slots, the cooling tubes of a slot having a total wall cross-sectional area which is smaller than the damping rod cross section, said slots running axially in the air-gap surfaces of the pole shoes, and short-circuiting rings connecting said damping rods to each other, in which each damping winding slot contains at least one axially directed cooling tube and at least two adjacent part-conductors, said part-conductors having longitudinal grooves with contact surfaces engaging the cooling tubes, and wedge means in the pole shoes tapering in a direction substantially perpendicular to the axial direction and engaging the part-conductors to clamp the cooling tubes in the grooves of the part-conductors.

* * * * *